July 2, 1968  J. A. ORSINO  3,391,029
UNDERWATER BATTERY CASING
Filed April 8, 1966  2 Sheets-Sheet 1

INVENTOR
JOSEPH A. ORSINO

BY E. Janet Berry
ATTORNEY

July 2, 1968   J. A. ORSINO   3,391,029
UNDERWATER BATTERY CASING
Filed April 8, 1966   2 Sheets-Sheet 2

INVENTOR
JOSEPH A. ORSINO
BY E. Janet Berry
ATTORNEY

United States Patent Office 3,391,029
Patented July 2, 1968

3,391,029
UNDERWATER BATTERY CASING
Joseph A. Orsino, P.O. Box 127, Manhattan
Beach, Calif. 90266
Filed Apr. 8, 1966, Ser. No. 541,268
10 Claims. (Cl. 136—166)

The present invention relates to storage batteries and casings and more particularly to a power package or power supply of this character which is intended and designed to operate under water and at substantial depths.

With increasing underwater operations, where depths of several miles are contemplated, presently known batteries cannot be employed, by reason of the pressures encountered, except where casings of sizes, weights and costs which are prohibitive to normal operations are utilized, since the pressure present under water (which are equivalent to approximately 0.5 pound per square inch for each foot in depth) become so excessive that the ordinary battery casings will be ruptured regardless of inherent strength.

It is essential that these depths, or even at maximum scubadiving depths, to equalize the external pressure with an equal presure within the battery container. A proposed solution to this problem is by the flooding of the interior of the battery, above the level of the liquid electrolyte, with oil which functions as a pressure equalizing fluid and tends to prevent rupture. However, the oil which floats on the battery electrolyte when the battery is in an up-right or vertical position will saturate the plates when the battery is inverted. Thus, this proposed solution cannot be utilized in all operations.

The present invention obviates the foregoing and other deficiencies of prior art batteries.

Accordingly, it is a major object of the present invention to provide a submersible battery capable of operating under water at extreme depths and in any position.

It is a further object of the invention to provide a novel submersible battery which will be light-weight and compact in size and which may be manufactured with particular economy.

Further objects and advantages of the invention will be readily apparent from the following description, taken in conjunction with the accompanying drawings, wherein.

Figure 1:
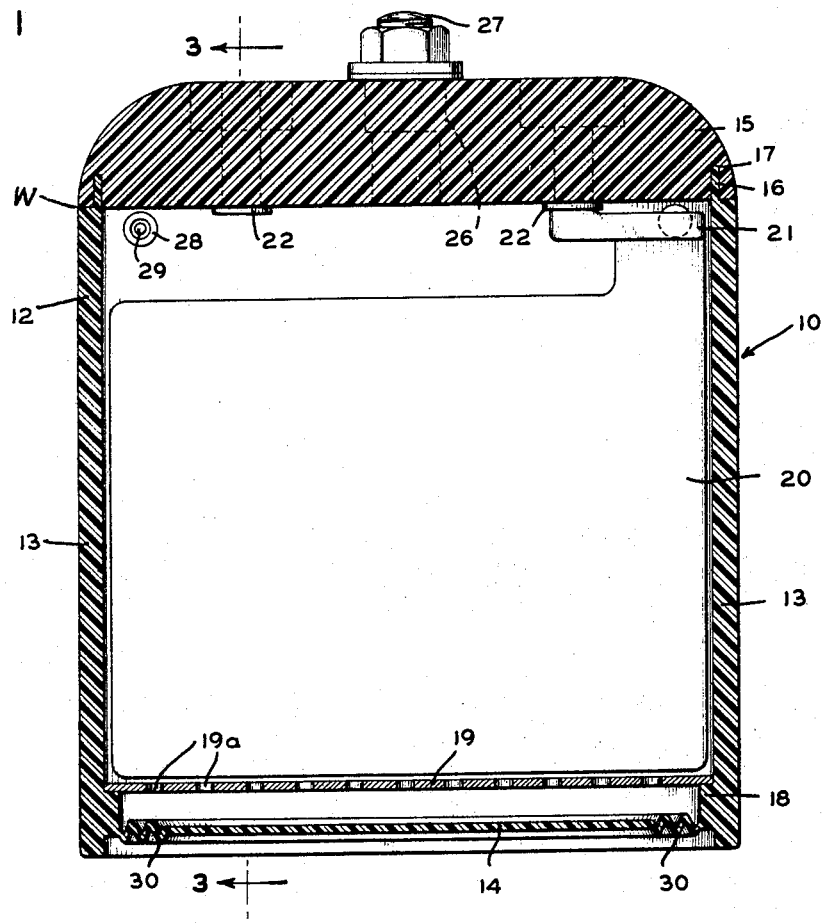
FIGURE 1 is a vertical sectional view through a novel battery constructed in accordance with the present invention.
Figure 2:
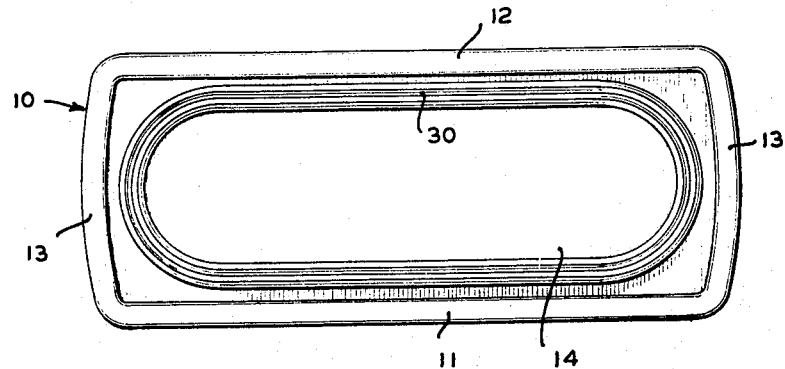
FIGURE 2 is a bottom plan view of the battery of FIGURE 1.

As shown in the drawings, the battery casing indicated generally at 10 is produced from any suitable plastic material, desirably through a molding operation, and includes front and rear walls 11 and 12, end walls 13, and a bottom wall 14, providing an integral structure.

The plastic material employed must be inert to the battery acids and certain of the polyolefins, and polyethylene in particular, have been found to be particularly suitable for present purposes.

The battery top or cover plate 15, which also may be molded from similar or identical plastic material, is of substantial thickness and includes a continuous groove 16 in the bottom face thereof, the front, rear and side walls of the battery casing 10 being provided with an upstanding and continuous peripheral rib 17 which is received within the groove 16 of the cover plate, a fluid-tight engagement thus being assured.

Interiorly of the battery casing 10, immediately above the bottom wall 14, a peripheral rib or shoulder 18 is provided and a supporting plate 19 seats upon this rib and thereabove are secured the usual plates 20 (anodes and cathodes) and separators, appropriate connections 21 to the battery terminals 22 being provided as is well known in this art.

Figure 3:
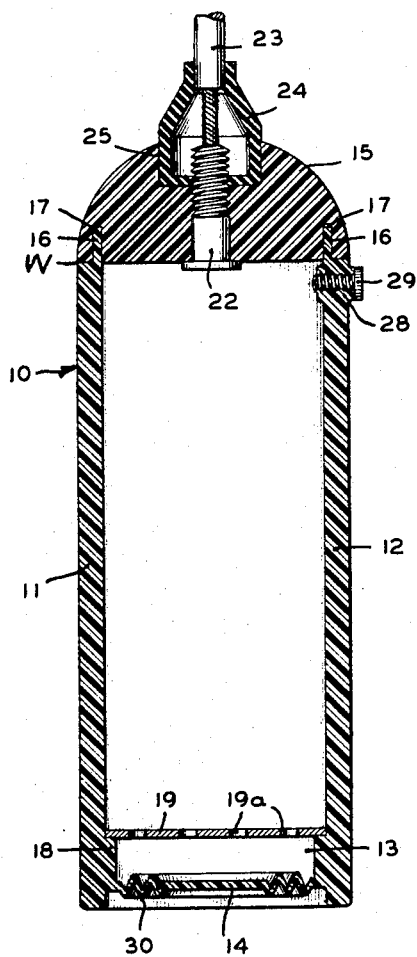
FIGURE 3 is a vertical sectional view transversely of the battery, taken on the line 3—3 of FIGURE 1 and looking in the direction of the arrows.

Desirably, reference being had to FIGURE 3 of the drawings, each battery terminal or post 22 is threaded into the battery cover plate 15 through the bottom wall thereof and electrical connection is had with the usual cable illustrated conventionally at 23, a flexible tubular gasket 24 of epoxy resin or the like, received with a recess 25 in the upper surface of the battery cover, being provided to insure a fluid-tight electrical engagement.

The battery cover plate 15 also is provided with a filler cap 26 of conventional design which includes a gas relief valve 27 as is known in this art. Additionally, bosses 28 may be provided in one of the battery walls, at a level above that of the battery plates 20, for the threaded reception of auxiliary gas relief valves 29, also as well known in this art, when the battery is intended for service in a vertical position.

While the front, rear and side walls of the battery casing 10 are of substantial rigidity, the bottom wall 14 of the casing is substantially thinner than the other walls, is inherently flexible, and includes a plurality of concentric corrugations 30, providing peaks and valleys, and thus constituting a flexible pressure differential diaphragm or bellows. With this construction, external pressures which increase as the battery is lowered beneath the water surface will be equalized. Thus, the only effect of compressive forces within the battery will be to equalize the external pressure since water itself may be compressed only to a very small degree.

In operation, the battery is assembled and the cover 15 positioned in firm closed relationship insofar as the groove 16 and complementary rib 17 are connected and through a simple heat-sealing step, casing and cover being of thermo-plastic materials, the joint between casing and cover is welded as indicated, at W. The battery then is filled to capacity with electrolyte to a level adjacent the mouth of the filling aperture within which the filler cap 26 is received and battery function will not be affected adversely during operation as by any change in position from the vertical.

As illustrated in FIGURES 1 and 3 of the drawings, the supporting plate 19 is provided with a multiplicity of spaced apertures 19a to permit free passage of electrolyte therethrough.

Figure 4:
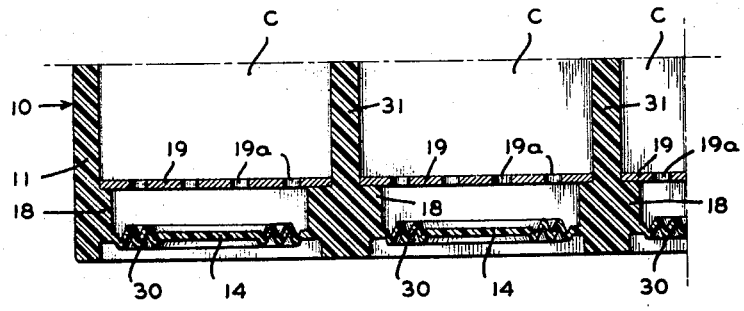
FIGURE 4 is a fragmentary sectional view, similar to FIGURE 3, through the lower portion of a multiple cell battery constructed in accordance with the present invention.

It is contemplated that the battery may, if desired, include a pulrality of cells, in which event each cell will include pressure equalizing bellows structure. Such an arrangement has been illustrated, fragmentarily, in FIGURE 4 of the drawings.

As shown, adjacent cells C are formed by transverse and vertically disposed partitions 31, desirably formed integrally with the battery casing. Each of these cells, above the bottom wall of the casing, will be provided with a peripheral rib 18 for seating the perforated plate 19; further, each bottom wall 14, identically as described hereabove, will be substantially thinner than the remaining casing walls and partition (or partitions) 31 and will include a plurality of concentric corrugations 30, providing peaks and valleys, and thus constituting a separate and flexible pressure differentiation diaphragm or bellows for each cell. It should be understood that the number of such cells in any one battery will have direct relationship to size and power requirements.

It will be understood that lead-acid batteries do not gas during discharge; thus, the inclusion of relief valves to relieve any gas build-up within the battery is merely a safety precaution. Further, during any recharging operation, when the battery is removed from the water, these valves will be removed.

It is also contemplated that the battery may be constructed for operation in a horizontal position, in which event the cover will be solid and the filler plug will be located, desirably, in the top wall of the battery casing.

There has thus been described a novel submersible battery and casing which may be manufactured with particular economy and will function with maximum efficiency at extreme depths and severe pressures and without regard to change in attitude as from the vertical to the horizontal, and the like. It will be obvious to those skilled in this art that various changes may be made in the invention without departing from the scope and spirit thereof and the invention is not considered limited by that which is shown in the drawings and described in the specification and reference therefor is had to the claim for summaries of the invention and of the novel features of construction and novel combinations of parts for all of which protection is desired.

What is claimed is:

1. A battery comprising a casing produced from molded plastic material and including integral front, rear, end and bottom walls providing an open receptacle, a cover for said casing, and means for providing a fluid-tight seal between said cover and casing, one of said walls being of lesser thickness than the remaining walls and of inherent flexibility, said flexible wall including a plurality of concentric corrugations providing peaks and valleys surrounding a flat central portion and constituting a pressure differential bellows for equalizing external pressures and compressive forces developed within the battery casing during battery discharge.

2. A battery as set forth in claim 1 where the inner surfaces of the front and side walls of said casing are provided with a peripheral shoulder immediately adjacent the bottom wall and horizontally disposed plate is seated upon said shoulder providing a battery plate receiving compartment above said horizontally disposed plate.

3. A battery as set forth in claim 2 where said cover includes a pair of terminal posts and a filler cap, anode and cathode plates supported within said battery plate receiving compartment, connections between said plates and said terminal posts, and electrolyte filling said casing to a level immediately beneath the lower surface of said filler cap.

4. A battery as set forth in claim 3 where each of said terminal posts is provided with an extremity for attachment of an electrical cable, and a flexible tubular gasket, seated in a recess in the top wall of said cover, surrounding the cable receiving extremity of said terminal post to provide fluid-tight engagement between said terminal post and electrical cable.

5. A battery as set forth in claim 1 where the bottom wall of said battery constitutes said flexible wall.

6. A battery as set forth in claim 1 where said casing is provided with an upstanding peripheral rib surrounding the open mouth thereof and the bottom wall of the cover is provided with a complementarily shaped continuous groove within which said peripheral rib is received to provide a fluid-tight joint between cover and casing.

7. A battery as set forth in claim 6 where a heat seal is provided at the meeting peripheral edges of said cover and casing.

8. A battery as set forth in claim 7 where a pressure relief valve is provided in one of the walls of said casing.

9. A battery comprising a casing produced from molded plastic material and including integral front, rear, end and bottom walls providing an open receptacle, at least one vertical transverse partition in said casing providing said receptacle with at least two cells, a cover for said casing and means for providing a fluid-tight seal between said cover and casing, the bottom wall of each cell being of inherent flexibility and of lesser thickness than the remaining walls, said flexible wall including a plurality of concentric corrugations providing peaks and valleys surrounding a flat central portion and constituting a pressure differential bellows for each of said cells for equalizing external pressures and compressive forces developed within the cell during battery discharge.

10. A battery as set forth in claim 9 where said cover includes a pair of terminal posts and a filler cap, anode and cathode plates supported within each cell of said battery casing, connections between said plates and said terminal posts, each of said terminal posts being provided with an extremity for attachment of an electrical cable, a flexible tubular gasket, seated in a recess in the top wall of said cover, surrounding the cable receiving extremity of each terminal post to provide fluid-tight engagement between said terminal posts and electrical cables, and electrolyte filling said casing to a level immediately beneath the lower surface of said filler cap.

References Cited

UNITED STATES PATENTS

| 2,733,389 | 1/1956 | Ellison | 136—166 XR |
| 3,208,884 | 9/1965 | Jensen | 136—178 |

FOREIGN PATENTS

| 544,627 | 9/1922 | France. | |

WINSTON A. DOUGLAS, *Primary Examiner.*

D. L. WALTON, *Assistant Examiner.*